(12) United States Patent
Zhao et al.

(10) Patent No.: US 12,040,870 B2
(45) Date of Patent: Jul. 16, 2024

(54) MULTIPLE ANTENNA PANEL UPLINK COMMUNICATION

(71) Applicant: Sony Group Corporation, Tokyo (JP)

(72) Inventors: Kun Zhao, Stockholm (SE); Erik Bengtsson, Eslöv (SE); Olof Zander, Södra Sandby (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/424,102

(22) PCT Filed: Jan. 28, 2020

(86) PCT No.: PCT/EP2020/051999
§ 371 (c)(1),
(2) Date: Jul. 19, 2021

(87) PCT Pub. No.: WO2020/157040
PCT Pub. Date: Aug. 6, 2020

(65) Prior Publication Data
US 2022/0103223 A1    Mar. 31, 2022

(30) Foreign Application Priority Data
Jan. 28, 2019  (SE) .................................... 1930028-4

(51) Int. Cl.
*H04B 7/06* (2006.01)
*H04B 7/0404* (2017.01)
(52) U.S. Cl.
CPC ......... *H04B 7/0693* (2013.01); *H04B 7/0404* (2013.01); *H04B 7/0695* (2013.01)

(58) Field of Classification Search
CPC .. H04B 7/0693; H04B 7/0404; H04B 7/0695; H04B 7/0691; H04B 7/0408
See application file for complete search history.

(56) References Cited

U.S. PATENT DOCUMENTS

| | | | |
|---|---|---|---|
| 10,270,501 B2 * | 4/2019 | Nagata | H04B 7/08 |
| 2013/0028128 A1 * | 1/2013 | Novak | H04B 17/382 370/252 |
| 2017/0352953 A1 | 12/2017 | Petersson et al. | |

(Continued)

FOREIGN PATENT DOCUMENTS

| | | |
|---|---|---|
| CN | 102742208 A | 10/2012 |
| CN | 106797242 A | 5/2017 |

(Continued)

OTHER PUBLICATIONS

International Search Report and Written Opinion from corresponding International Application No. PCT/EP2020/051999, dated Mar. 23, 2020, 14 pages.

(Continued)

*Primary Examiner* — Sung S Ahn
(74) *Attorney, Agent, or Firm* — Tucker Ellis LLP (57) ABSTRACT

A method of operating a wireless communication device (102) in a wireless communication system (100) comprises transmitting a control signal to a node (102) of the wireless communication system (100). The control signal is indicative of a mapping between at least one antenna port (5031-5033) and at least one antenna panel (5023, 5024) of the wireless communication device (102).

18 Claims, 4 Drawing Sheets

(56) References Cited

U.S. PATENT DOCUMENTS

| | | |
|---|---|---|
| 2018/0219660 A1 | 8/2018 | Cezanne |
| 2018/0316407 A1 | 11/2018 | Rahman et al. |
| 2018/0367205 A1 | 12/2018 | Liu |
| 2018/0367986 A1* | 12/2018 | Sundararajan .... H04W 72/1205 |
| 2020/0107327 A1* | 4/2020 | Wang .................. H04W 72/044 |
| 2020/0107341 A1* | 4/2020 | Zhang .................... H04L 5/001 |
| 2020/0162133 A1* | 5/2020 | Harrison .............. H04B 7/0456 |
| 2020/0169995 A1* | 5/2020 | Nam .................... H04B 7/0628 |

FOREIGN PATENT DOCUMENTS

| | | |
|---|---|---|
| CN | 107409312 A | 11/2017 |
| WO | 2014077742 A1 | 5/2014 |
| WO | 2017048178 A1 | 3/2017 |
| WO | 2018127426 A1 | 7/2018 |
| WO | 2018171614 A1 | 9/2018 |
| WO | 2018231141 A1 | 12/2018 |

OTHER PUBLICATIONS

3GPP, "Release 15," TS 36.211 V15.0.0, Dec. 2017, 79 pages.

3GPP, "Technical Specification Group Radio Access Network; NR; Physical channels and modulation (Release 15)," TS 38.211 V15.3.0, Sep. 2018, 96 pages.

Nokia et al., "Enhancements on Multi-beam Operation," 3GPP TSG RAN WG1 Meeting #95, R1-1813490, Nov. 12-16, 2018, 15 pages.

NTT Docomo, Inc., "Discussion on multi-beam enhancement," 3GPP TSG RAN WG1 Meeting #95, R1-1813867, Nov. 12-16, 2018, 15 pages.

CATT, "Multi-panel/multi-TRP transmission", 3rd Generation Partnership Project (3GPP), Feb. 2017, Athens, Greece, R1-1702071, 5 pages.

* cited by examiner

MULTIPLE ANTENNA PANEL UPLINK COMMUNICATION

TECHNICAL FIELD

Various examples of the invention generally relate to supporting of uplink communication using multiple antenna panels of a wireless communication device. In particular, various examples related to enabling a node of a wireless communication network to assist a wireless communication device in configuring multiple antenna panels for uplink communication.

BACKGROUND OF THE INVENTION

Increasing use of mobile voice and data communications may require more efficient utilization of available radio frequency resources. Further, in mobile communication, there is a continuous need for higher transmission throughput and reduction of a power consumption of battery powered mobile communication devices. Increasing transmission throughput and efficient utilization of available radio frequency resources may be achieved by the so-called multiple input and multiple output (MIMO) technology, which may be used in wireless radio telecommunication systems for transmitting information between the devices, for example between a base station and a user equipment. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

For example, a user equipment may include an array of antennas (antenna array) that can transmit and/or receive (communicate) in a beamformed manner. I.e., phase-coherent transmission across the antennas of the antenna array of an antenna panel is possible. Thereby, it is possible to communicate on dedicated beams. Thus, spatial multiplexing and/or spatial diversity may be used to increase the transmission throughput.

Further, a user equipment may include multiple antenna panels, each antenna panel including one or more antenna arrays. The antenna panels may be arranged at different locations of the user equipment, for example one antenna panel at the top side of the user equipment and a further antenna panel at the bottom side of the user equipment. By provisioning multiple antenna panels the flexibility in communicating on multiple beams is increased. This helps to further increase the transmission throughput.

On the other hand, operating multiple antenna panels may sometimes increase the power consumption at the user equipment.

For example, from the Third Generation Partnership Project (3GPP) document R1-1813867, it is known to implement an identifier (panel ID) which can be used for indicating support of panel-specific uplink transmission. Based on the panel IDs, a base station (for example gNB) may possess knowledge whether the user equipment has deactivated some antenna panels. For example, it may be desirable for a user equipment to deactivate panels with a poor link quality in order to save power. The multiple beams of each antenna panel may be assessed by transmission of uplink pilot signals, for example sounding reference signals (SRS). For example, in the Third Generation Partnership Project (3GPP) document R1-1813490 it is proposed that a panel and beam selection for codebook-based transmissions may be implemented by associating an SRS resource set for beam management to a user equipment panel. In particular, as proposed in the Third Generation Partnership Project (3GPP) document R1-1813867, the user equipment may report the association between SRS resource and the panel. Then, the network (for example a base station) may configure SRS resource indices corresponding to a smaller number of user equipment panels when expected gain of using more number of user equipment panels is marginal. Thus, the above proposals contribute to assessing beams provided by the antenna panels of the user equipment such that for each used antenna panel the most appropriate beam may be selected.

In some scenarios, reporting the association between SRS resource and the panel by the user equipment may not be sufficient for the network for efficiently exploiting the capabilities of the user equipment.

SUMMARY OF THE INVENTION

Therefore, there is a need of advanced techniques for implementing communication in a communication system including a transmitter and a receiver, wherein the transmitter includes multiple antenna panels for beamforming, in particular for forming multiple beams simultaneously at an antenna panel. Specifically, there is a need for techniques which overcome or mitigate at least some of the above identified restrictions and drawbacks.

This need is met by the features of the independent claims. The features of the dependent claims define embodiments.

A method of operating a wireless communication device in a wireless communication system comprises transmitting a control signal to a node of the wireless communication system. The control signal is indicative of a mapping between at least one antenna port and at least one antenna panel of the wireless communication device.

A computer program or a computer-readable storage medium includes program code. The program code can be executed by a control circuitry. Executing the program code causes the control circuitry to perform a method of operating a wireless communication device in a wireless communication system. The method includes transmitting a control signal from the wireless communication device to a node of the wireless communication system. The control signal is indicative of a mapping between at least one antenna port of the wireless communication device and at least one antenna panel of the wireless communication device.

A method of operating a wireless communication device in a wireless communication system comprises controlling a modem of the wireless communication device to transmit a control signal to a node of the wireless communication system. The control signal is indicative of a mapping between at least one antenna port and at least one antenna panel of the wireless communication device.

A method of operating a node of a wireless communication system comprises receiving a control signal from a wireless communication device. The control signal is indicative of a mapping between at least one antenna port and at least one antenna panel of the wireless communication device.

A computer program or a computer-readable storage medium includes program code. The program code can be executed by a control circuitry. Executing the program code causes the control circuitry to perform a method of operating a node of a wireless communication system. The method includes receiving a control signal from a wireless communication device. The control signal is indicative of a mapping between at least one antenna port of the wireless communication device and at least one antenna panel of the wireless communication device.

A method of operating a node of the wireless communication system comprises controlling a modem of the node to receive a control signal from a wireless communication device. The control signal is indicative of a mapping between at least one antenna port and at least one antenna panel of the wireless communication device.

A wireless communication device comprises at least one antenna panel and control circuitry configured to transmit a control signal to a node of a wireless communication system. The control signal is indicative of a mapping between at least one antenna port and the at least one antenna panel of the wireless communication device.

A node of a wireless communication system comprises control circuitry configured to receive a control signal from a wireless communication device. The control signal is indicative of a mapping between at least one antenna port and at least one antenna panel of the wireless communication device.

It is to be understood that the features mentioned above and those described in detail below may be used not only in the described combinations, but also in other combinations or in isolation without departing from the scope of the invention.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

Hereinafter, techniques of wirelessly communicating using a communications system including two or more nodes are described. The nodes can implement a transmitter and a receiver. For example, the communications system can be implemented by a communications network and a user equipment (UE) that can be connected or connectable to the communications network.

The communications network (or, simply, network) may be a wireless network. For sake of simplicity, various scenarios are described hereinafter with respect to an implementation of the communications network by a cellular network. The cellular network includes multiple cells. Each cell corresponds to a respective sub-area of the overall coverage area. Other example implementations include Institute of Electrical and Electronics Engineers (IEEE) WLAN network, MulteFire, etc.

Hereinafter, techniques are described which facilitate transmission of signals by a wireless communication device, for example the user equipment (UE), comprising a wireless interface, the wireless interface including a modem, multiple antenna ports, and multiple antenna panels. As a general rule, the modem may include a digital front end and an analog front end.

A signal sequence may be output in the radio frequency (RF) band by the modem, e.g., in the range of 1 GHz to 40

GHz. As a general rule, a signal sequence may include multiple time-sequential symbols, each symbol encoding a number of bits. Specifically, because the modem can include multiple antenna ports, it is possible that the modem outputs multiple signal sequences, one via each antenna port. For example, the modem may include multiple amplifiers and phase shifters, e.g., one per antenna port. Antenna ports may thus be logical entities with distinguished reference signals. Antenna ports may be logical entities defined by the modem, mapped to physical connectors. For example, antenna ports may be defined on a physical layer according the open system interface (OSI) model. Symbols and sequences that are transmitted over an antenna port are subject to the same propagation conditions on the wireless link. Details with respect to antenna ports are described, e.g., in 3GPP Technical Specification (TS) 36.211 V15.0.0 (2017-12), section 5.2.1.

Further, as a general rule, each antenna panel may include one or more antenna arrays. Each antenna array may include multiple antennas in a well-defined spatial arrangement with respect to each other. Phase-coherent transmission can be implemented by an antenna array. Here, the phase and amplitude of each RF signal fed to the various antennas of the array may be defined with respect to each other. Thereby, beamforming becomes possible.

Beamforming generally describes a technique of applying directivity onto the transmission of RF signals: by using constructive and destructive interference between RF signals transmitted by different antennas of the antenna array, a preferred direction can be defined along which the RF energy is focused. Thereby, beamforming may facilitate spatial multiplexing and/or spatial diversity to thereby increase the transmission throughput.

The techniques described herein facilitate efficient and accurate beam management. Beam management generally describes logic associated with selecting the appropriate one or more beams for communication between the UE and an access node of the communications network. For uplink (UL) communication, a transmit beam at the UE may be selected. It would also be possible to select a receive beam at the base station (BS) for UL communication. For downlink (DL) communication, a receive beam at the UE may be selected. It would also be possible to select a transmit beam at the BS. In case a plurality of antenna ports are feeding RF signals to an antenna panel of a user equipment, a plurality of transmit beams may be used for data transmission simultaneously such that a higher rank data communication utilizing spatial multiplexing may be achieved. Each transmit beam may have a specific transmit characteristic, for example specific transmitted direction.

For beam management of UL communication, the UE may transmit one or more UL reference signal sequences. An example UL reference signal sequence is the UL SRS sequence, see 3GPP TS 36.211 V15.0.0 (2017-12), section 5.5.3; or 3GPP TS 38.211 V15.3.0, section 6.4.1.3.3. While—as a general rule—various kinds and types of UL reference signal sequences may be used, hereinafter, various examples will be described in connection with SRS sequences, for sake of simplicity. In some examples, there may be a one-to-one mapping between SRS sequences and antenna ports. In other examples, there may be a one-to-one mapping between SRS sequences and transmission beams.

The communications network can measure a receive property of the UL SRS sequences, e.g., amplitude, phase, etc. Then, the network can determine a quality of a respective physical transmission channel from the UE to an access node (AN), the physical transmission channel being associated with a corresponding transmit beam at the UE and a transmission path from the UE to the access node (AN) of the communications network (and, generally, a receive beam of the AN). Such process is generally referred to as channel sounding. The beam management is then based on the channel sounding.

Hereinafter, techniques are described which facilitate reduction of power consumption at the UE. The techniques described herein may facilitate efficient and accurate channel sounding. The techniques thereby enable selection of appropriate beams for reliable and power-efficient transmission. Thus, beam management can be tailored.

According to various examples, this is achieved by providing to the network, for example to an access node, information on an association/mapping between antenna ports and antenna panels of a wireless communication device. Thus, information regarding which antenna ports can be coupled with which antenna panels can be provided.

Thereby, it would be possible to take into account activation or deactivation of antenna panels when performing the beam management. For example, it would be possible to select one or more beams formed by an antenna array of a first antenna panel so that a second antenna panel can be deactivated. To do this, it can be checked that one or more available antenna ports are mapped to the first antenna panel. Thus, the power consumption at the user equipment can be reduced and a higher rank communication via the first antenna panel may be achieved thus increasing transmission throughput.

Figure 1:
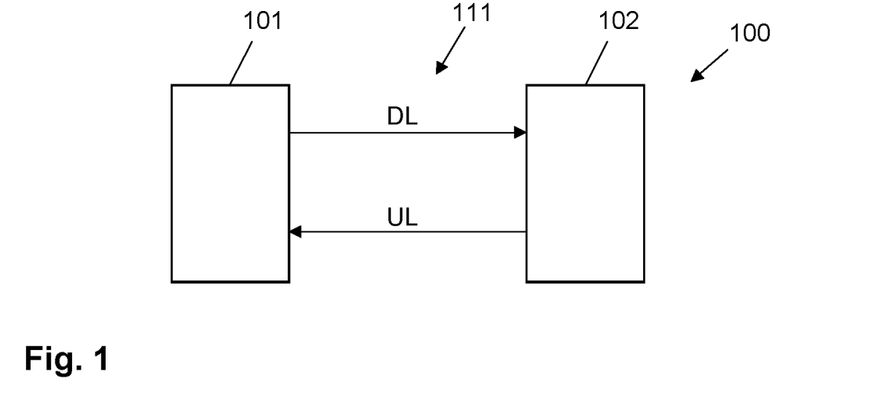
FIG. 1 schematically illustrates a communication system according to various examples.

FIG. 1 schematically illustrates a wireless communication system 100 that may benefit from the techniques disclosed herein.

The wireless communication system 100 includes an access node (AN) 101 of a cellular network (not shown in FIG. 1) and a user equipment (UE) 102. Because the AN 101 is part of a cellular network, reference is made to a base station (BS) hereinafter. In other types of communication systems, other types of ANs may be employed.

A wireless link 111 is established between the AN 101 and the UE 102. The wireless link 111 includes a downlink (DL) from the AN 101 to the UE 102; and further includes an uplink (UL) from the UE 102 to the AN 101.

The UE 102 may be in general a wireless communication device and may be one of the following: a smartphone; a cellular phone; a table; a notebook; a computer; a smart TV; an MTC device; an eMTC device; an IoT device; an NB-IoT device; a sensor; an actuator; etc.

Figure 2:
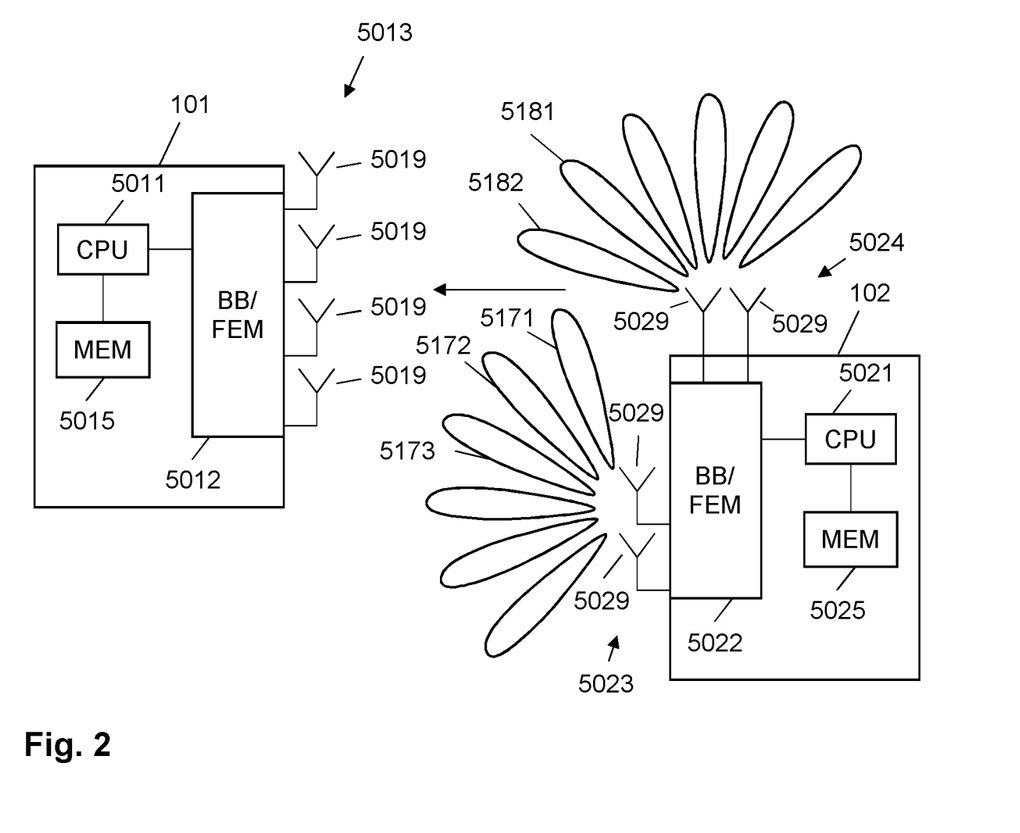
FIG. 2 schematically illustrates details of nodes of the communication system of FIG. 1.

FIG. 2 schematically illustrates the BS 101 and the UE 102 in more detail.

The BS 101 includes a processor 5011, a memory 5015, and a wireless interface 5012 (labeled base band/front end module, BB/FEM in FIG. 2), forming control circuitry. The wireless interface 5012 is coupled via antenna ports (not shown in FIG. 2) with an antenna panel 5013 including a plurality of antennas 5019 that form an antenna array. The BS 101 may comprise more than one antenna panel, for example a plurality of antenna panels which are locally distributed.

The memory 5015 may be a non-volatile memory. The memory 5015 may store program code that can be executed by the processor 5011. Executing the program code may cause the processor 5011 to perform techniques with respect to: receiving control information; receiving signal sequences; comparing (e.g., correlating) the received signal sequences with reference signal sequences; participating in beam management; etc.

The UE 102 includes a processor 5021, a memory 5025, and a wireless interface 5022 (labeled base band/front end module, BB/FEM in FIG. 2), forming control circuitry. The wireless interface 5022 is coupled via antenna ports (not shown in FIG. 2) with antenna panels 5023 and 5024, each including a plurality of antennas 5029.

The memory 5025 may be a non-volatile memory. The memory 5025 may store program code that can be executed by the processor 5021. Executing the program code may cause the processor 5021 to perform techniques with respect to: transmitting control information; controlling the wireless interface 5022 to transmit reference sequences using beamforming; controlling the wireless interface 5022 to transmit payload and control information using beamforming and spatial multiplexing; participating in beam management; etc.

As illustrated in FIG. 2, the UE 102 may include two antenna panels 5023 and 5024, each comprising an antenna array configured to transmit signals using beamforming, for example based on a predefined codebook of directions (each identified by a beamforming vector) that cover an angular space. Corresponding transmit beams can be used. As shown in FIG. 2, each antenna panel may be configured to transmit in at least six beam directions. However, any other number of beam directions may be supported and the number of beams may differ from one antenna panel to another. The antenna panels 5023 and 5024 may be arranged at different locations of the user equipment 102 such that the beams of antenna panel 5023 cover a different angular space than the beams of antenna panel 5024. Depending on the arrangement of the user equipment 102 with respect to the access node 101, some of the beams of antenna panels 5023 and 5024 may be more adequate for data communication than others.

For example due to hardware restrictions, the user equipment 102 may be limited to a number of different beams of each panel, which can be supported simultaneously. For transmitting a beamformed signal, corresponding radiofrequency (RF) signals may be output to some or all antennas 5029 of the corresponding antenna panel 5023/5024 with a defined amplitude and phase for each antenna 5029. The amplitude and phase values may be predefined in a codebook for each beam. For example, an antenna port may receive a signal to be transmitted, for example a data or control signal, and may provide for each antenna 5029 of the corresponding antenna panel a corresponding RF signal having the predefined amplitude and phase. Depending on the number of antenna ports assigned to a single antenna panel, a corresponding number of signals may be transmitted simultaneously by the antenna panel using each an individual transmit beam.

Figure 3:
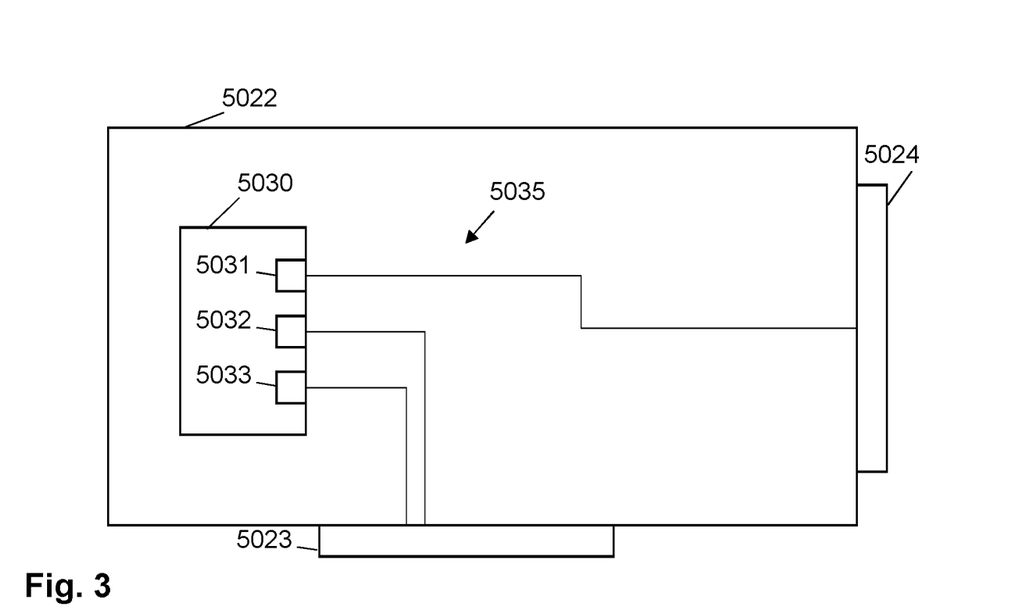
FIG. 3 schematically illustrates a mapping between antenna ports and antenna panels of a wireless communication device according to various examples FIG. 4 schematically illustrates a mapping between antenna ports and antenna panels of a wireless communication device according to further examples.

FIG. 3 illustrates aspects with respect to the wireless interface 5022 of the user equipment 102. As illustrated in FIG. 3, the wireless interface 5022 includes a modem 5030 including three antenna ports 5031-5033. These antenna ports 5031-5033 are coupled via a wiring 5035 with the two antenna panels 5023 and 5024.

In the example of FIG. 3, the wiring 5035 defines a mapping between (i) the antenna port 5031 and (ii) the panel 5024; and between the (i) antenna port 5032 and (ii) the antenna panel 5023; and between (i) the antenna port 5033 and (ii) the antenna panel 5023. As a result, the user equipment 102 shown in FIG. 3 may simultaneously transmit two different signals using two different transmit beams via antenna ports 5032, 5033 and antenna panel 5023. At the same time, the user equipment 102 may transmit a further signal using beamforming via antenna port 5031 and antenna panel 5024, i.e., using another transmit beam.

As a general rule, the wiring 5035 can be configured differently for different wireless interfaces 5022 of different UEs 102. Thus, different UEs 102 can have different mappings between antenna ports and antenna panels.

Figure 4:
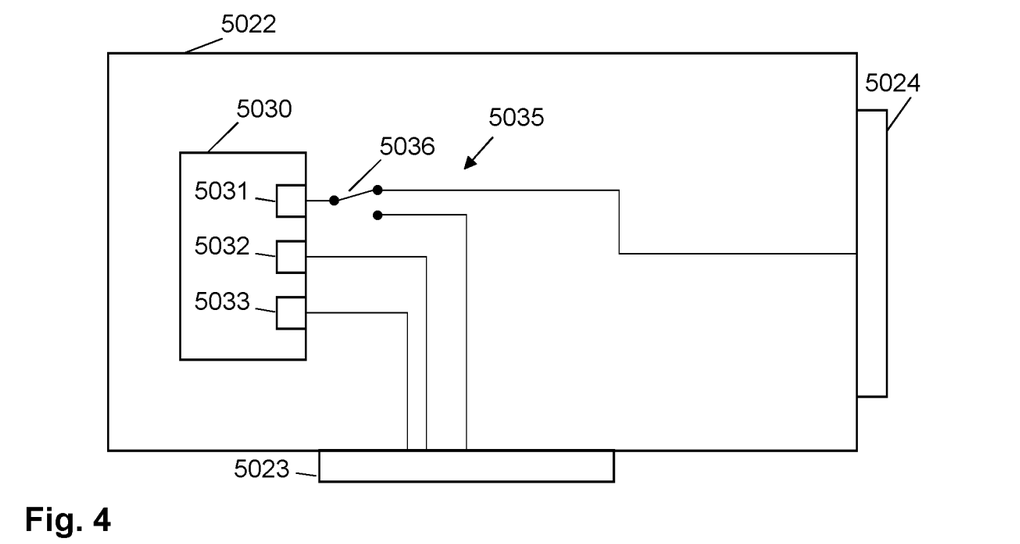

For example, as shown in FIG. 4, the wiring 5035 may define a mapping between (i) the antenna port 5031 and (ii) the antenna panels 5023 and 5024; between (i) the antenna port 5032 and (ii) the antenna panel 5023; and between (i) the antenna port 5033 and (ii) the antenna panel 5023. A—generally optional—switch 5036 is provided that can route the RF signals output by the antenna port 5031 either to the antenna panel 5023, or to the antenna panel 5024; thus a configurable mapping is implemented.

As a result, in the position of the switch 5036 shown in FIG. 4, the user equipment 102 may simultaneously transmit two different signals using two different transmit beams via antenna ports 5032, 5033 and antenna panel 5023. At the same time, the user equipment 102 may transmit a further signal using a transmit beam via antenna port 5031 and antenna panel 5024.

When the switch 5036 is in the other position and thus coupling antenna port 5031 to antenna panel 5023, the user equipment 102 may simultaneously transmit three different signals using three different transmit beams via antenna ports 5031, 5032, 5033 and antenna panel 5023. However, no signal can be transmitted via antenna panel 5024 in this configuration of the mapping.

Both, the UE-dependent mapping and the dynamically configurable mapping at a given UE motivate the finding that there can be a benefit from reporting information on the association between antenna ports 5031 to 5033 and antenna panels 5023 and 5024.

As a general rule, a mapping indicating which antenna ports are coupled or may be coupled to each antenna panel of the wireless communication device may be communicated from the wireless communication device (e.g. UE) to the access node (e.g. BS). In the following, in connection with FIG. 5 and FIG. 6, exemplary aspects with respect to beam management benefiting from such reporting of the mapping will be described. The method steps shown in FIG. 5 may be performed by the user equipment 102 and the method steps shown in FIG. 6 may be performed by the access node 101. It is to be noted that in particular method steps of blocks 501, 503 to 507, 601 and 603 to 606 may be optional.

Figure 5:
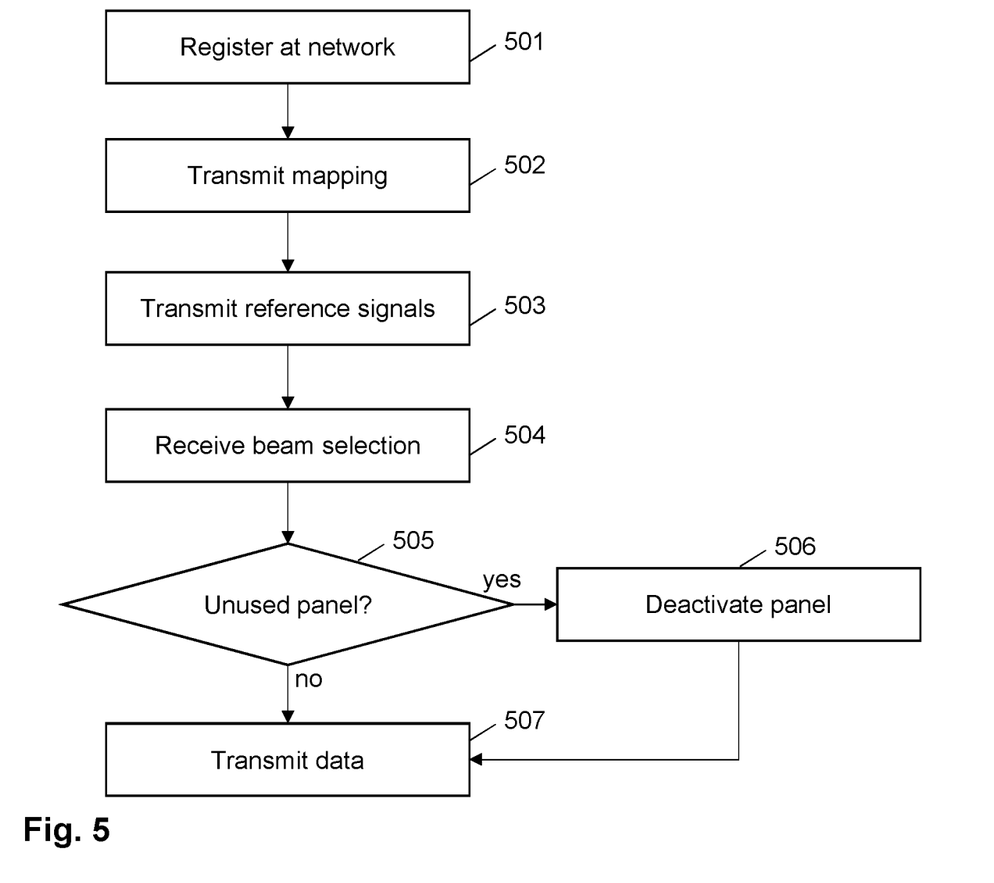
FIG. 5 is a flowchart of a method according to various examples.
Figure 6:
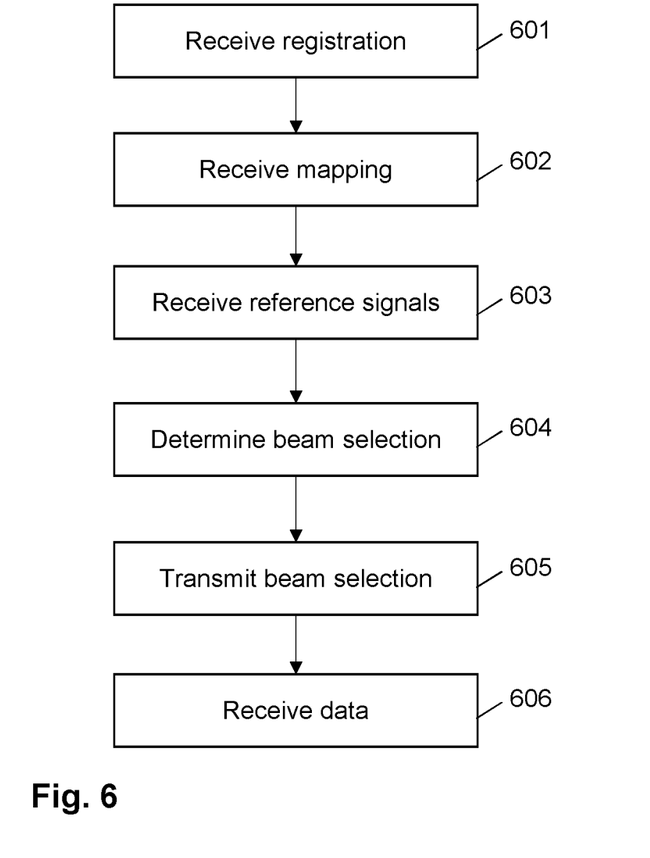
FIG. 6 is a flowchart of a method according to various examples.

In block 501 the user equipment 102 may register at the network. For example, the user equipment 102 may transmit a registration request to the access node 101 and the access node 101 may respond in block 601 to the registration request by providing network information, synchronization and assignment of communication resources for the user equipment 102.

After registering, the user equipment 102 may transmit in block 502 a control signal to the access node 101. The control signal is indicative of a mapping between at least one antenna port of the user equipment 102 and at least one antenna panel of the user equipment 102.

For example, the control signal can be indicative of a current configuration of the mapping, e.g., in scenarios where the mapping is UE-configurable.

As a general rule, there are various options available for implementing the control signals. In different examples, more or less information may be conveyed by the control signal. Below, some examples are given.

In some examples, the mapping may indicate a number of antenna ports of the at least one antenna port of the user equipment 102 per antenna panel of the at least one antenna panel of the user equipment 102. For example, the user equipment 102 may transmit a list containing for each antenna panel of the user equipment 102 a corresponding number of antenna ports which are assigned to the corresponding antenna panel. For example, the exemplary user equipment shown in FIG. 3 may transmit a list with two entries, the first entry indicating that two antenna ports are assigned to the first antenna panel 5023 and that one antenna port is assigned to the second antenna panel 5024. A corresponding data structure may be represented by K with K being the number of antenna panels. In the example shown in FIG. 3 the control information to be transmitted may be represented as $\{n_1=2, n_2=1\}$.

In some examples, the mapping may be indicative of one or more shared antenna ports that are mapped to two or more antenna panels of the user equipment 102. For example, the user equipment 102 may transmit a list with an entry for each antenna panel combination of the antenna panels of the user equipment 102 and the corresponding entry indicates the number of antenna ports that are shared by this antenna panel combination. In the example shown in FIG. 4, the user equipment may transmit a list containing one entry for the combination of antenna panel 5023 and antenna panel 5024. This entry may have the value "1" indicating that one port, i.e. port 5031, is shared by antenna panel 5023 and antenna panel 5024. A corresponding indexing system may be defined in case the user equipment 102 comprises more than two antenna panels and one or more antenna ports may be shared by more than two antenna panels. A corresponding data structure may be represented by $\{n_{k,l,m}, \ldots\}$ with k,l,m, . . . being all combinations of the antenna panels. In the example shown in FIG. 4 the control information to be transmitted for the shared antenna ports may be represented as $\{n_{1,2}=1\}$.

The above described mappings are only an example and other mappings may be implemented. The mapping may further be indicative of a set of identifiers identifying the antenna ports and/or the antenna panels. Based on the identifiers a mapping indicating the port assignment and also shared port assignments may be implemented. For instance, unique identifiers according to a ruleset may be employed.

Different ports may have different baseband properties, for example different sampling rates assigned to the ports. By identifying the ports, the port properties may be considered in beam management. Furthermore, the port properties may also be included in the control signal transmitted to the base station.

As a further example, the mapping may comprise a matrix with for example each row representing an antenna panel and each column representing an antenna port. The matrix elements may indicate whether an assignment between the antenna panel and the antenna port is present or configurable in case of shared ports.

In block 602 the access node 101 receives the control information indicating the mapping.

Based on the received control information, the access node 101 may assign resources for transmitting reference signal sequences, for example for transmitting sounding reference signal (SRS) sequences for channel sounding the transmission channels, which are formed by beamforming, for example codebook based beamforming. The resources may be time-frequency resource elements defined in the wireless communication network. A time-frequency grid may be associated with the time-frequency resource elements. This is illustrated in connection with FIG. 7.

Figure 7:
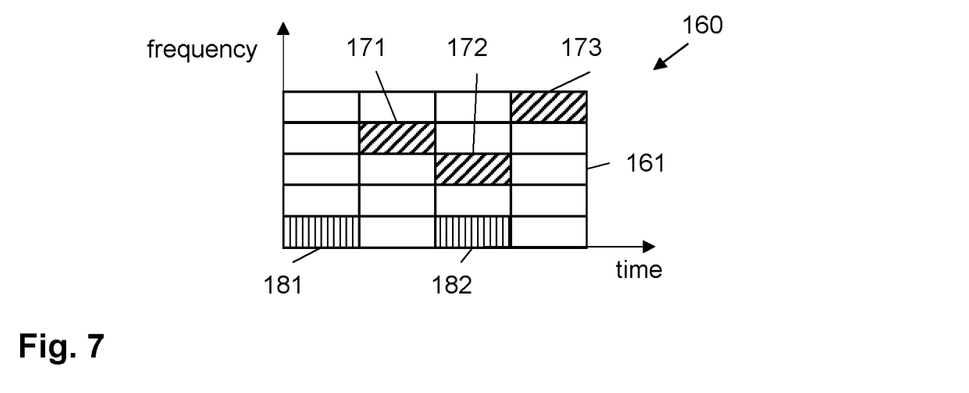
FIG. 7 schematically illustrates a time-frequency resource grid including multiple resource elements allocated for transmission of reference signal sequences according to various examples.

FIG. 7 illustrates aspects with respect to time-frequency resource elements 161 used for transmitting SRS sequences on the wireless link 111. As illustrated in FIG. 7, a time-frequency grid 160 defines multiple time-frequency resource elements 161. For example, an Orthogonal Frequency Division Multiplex (OFDM) technique including a carrier and multiple sub-carriers and defining timeslots for symbols can be used to define such time-frequency grid 160.

The time-frequency grid 160 facilitates time division duplexing (TDD) and frequency division duplexing (FDD): signals transmitted in different time-frequency resource elements 161 do not interfere.

Some of the time-frequency resource elements 161 are used for transmitting SRS (in FIG. 4, these time-frequency resource elements 161 are marked with a filling). For example, the access node 101 and the user equipment 102 can agree upon the particular time-frequency resource elements used for transmitting SRS.

Specifically, sequences of time-frequency resource elements 161 are used for transmitting SRS sequences. An SRS sequence can occupy multiple sequential time-frequency resource elements 161, e.g., a count of M resource elements.

For channel sounding certain beams, the user equipment 102 and the access node 101 can agree on particular time-frequency resource elements used for transmitting SRS using a specific beam. For example, resource element 171 may be assigned for transmitting SRS using beam 5171 of antenna panel 5023, resource element 172 may be assigned for transmitting SRS using beam 5172 of antenna panel 5023, resource element 173 may be assigned for transmitting SRS using beam 5173 of antenna panel 5023, resource element 181 may be assigned for transmitting SRS using beam 5181 of antenna panel 5024, and resource element 182 may be assigned for transmitting SRS using beam 5182 of antenna panel 5024. Corresponding resource elements may be assigned for transmitting SRS using the remaining beams of antenna panels 5023 and 5024, but for reasons of clarity and brevity in the following only the above mentioned five assignments will be considered in more detail.

In block 503 the user equipment 102 may transmit via each antenna port a corresponding reference signal to the access node via the respective antenna panel that is mapped to the respective beam. Each beam may be assigned to a specific port, such that a corresponding reference signal may be sent to the access node via the respective antenna panel and the assigned port. For example, an SRS may be transmitted via an antenna port coupled to the antenna panel 5024 in resource element 181 as a beamformed signal 5181. Subsequently, an SRS may be transmitted via an antenna port coupled to the antenna panel 5023 in resource element 171 as a beamformed signal 5171. Subsequently, an SRS may be transmitted via an antenna port coupled to the antenna panel 5023 in resource element 172 as a beamformed signal 5172, and simultaneously an SRS may be transmitted via an antenna port coupled to the antenna panel 5024 in resource element 182 as a beamformed signal 5182. Subsequently, an SRS may be transmitted via an antenna port coupled to the antenna panel 5023 in resource element 173 as a beamformed signal 5173. It is to be noted that, when transmitting SRS in resource elements 181 and 182, port 5031 has to be coupled to antenna panel 5024. Further beams may be sounded with corresponding SRSs, for example a beam sweep from each of antenna panels 5023 and 5024 may be performed for sounding beams in a plurality of directions thus covering the spatial area which may be irradiated by the corresponding antenna panel.

In block 603 the access node 101 receives the sounding reference signals transmitted by the user equipment 102 in block 503.

In block 604, based on the received sounding reference signals, for example SRS sequences, the access node 101 may determine a beam selection control signal which is indicative of at least one transmission beam to be used for further transmissions from the user equipment to the access node. For example, the access node 101 may determine those beams which provide the strongest signal, the lowest bit error rate, the highest data rate or the best synchronization. In particular, the access node 101 may consider the number of antenna ports assigned to each antenna panel when determining the beam selection control signal. For example based on the mapping between the antenna ports and the antenna panels, the access node 101 knows that in the exemplary user equipment 102 shown in FIG. 3 and FIG. 4, the antenna panel 5024 cannot transmit simultaneously two different beams, as it is coupled to only one antenna port. Therefore, higher rank transmission, for example rank 2, is not possible via antenna panel 5024 of user equipment 102. Further details concerning the beam selection will be provided in the following in connection with some examples.

In block 605, the access node 101 may transmit the determined beam selection control signal to the user equipment 101.

In block 504, the user equipment 102 may receive the beam selection control signal from the access node 101.

In block 505, the user equipment 102 may determine, based on the beam selection control signal, whether one or more antenna panels are not used, i.e. according to the beam selection control signal no transmissions are assigned to this one or more antenna panel. For example, the access node 101 may have determined that the most appropriate data communication can be achieved by transmitting data via three beams of antenna panel 5023 such that antenna port 5031 has to be coupled to antenna panel 5023, and antenna panel 5024 cannot be supported anymore. In this case, the user equipment 102 may deactivate antenna panel 5024 in block 506.

In a block 507, the user equipment 102 may transmit data using the beams indicated by the beam selection control signal. The access node 101 may receive the thus transmitted data in block 606. The data may contain payload and/or control data.

In the following, the beam selection in the access node 101 will be described in connection with two examples.

According to a first example, it is assumed that, based on the mapping transmitted in the control signal from the user equipment 102, the access node 101 is aware that the user equipment 102 has two antenna panels, wherein the first antenna panel 5023 is coupled to two ports 5032, 5033 and a second antenna panel 5024 is coupled to one port 5031 (see the user equipment 102 of FIG. 3). Further, the channel is deemed to be sufficiently good so that rank 2 (a.k.a., two transmit layers, according to MIMO technologies) transmission may be used. In the UL, the user equipment 102 sends SRSs, and the access node 101 measures their strengths. Assuming that for the five SRSs shown in FIG. 7, the following five relative strength values are observed: SRS 181: 10; SRS 171: 0; SRS182: 0; SRS 172: 9; SRS 173: 20. The access node 101 may now determine the two strongest beams, which in this example would correspond to beams 5181 and 5173, corresponding to strengths 10 and 20, respectively. This implies that both panels are active. However, if the access node considers beams 5172 and 5173, only the miniscule loss of obtaining strength 9 instead of 10 is expected. The gain, on the other hand, is that the UE 102 can deactivate panel 5024. The access node 101 may make such a decision as it knows that the user equipment can support $n_1=2$ ports for antenna panel 5023. Thus, power consumption of the user equipment 102 may be reduced.

In a second example, the same setup as in the first example is assumed. However, the following five relative strength values are observed: SRS 181: 10; SRS 171: 0; SRS182: 0; SRS 172: 15; SRS 173: 20. Due to the mapping between the antenna ports and the antenna panels communicated from the user equipment 102, the access node 101 has information on whether or not the user equipment 102 can make use of two ports for the same panel. Without this knowledge and the assumption that only one port is assigned to each antenna panel, the access node 101 would select beams 5181 and 5173. This is a bad choice for two reasons, (i) suboptimal beams have been selected, and (ii) both panels are active. With the knowledge concerning the number of ports assigned to each antenna panel, the access node 101 may select beams 5172 and 5173. Thus, the optimal beams are selected and antenna panel 5024 may be deactivated such that power consumption in the user equipment 102 may be reduced.

As the number of ports per panel may be fixed by hardware implementation, information of $n_k$ can be transmitted at an initial stage of the communication (e.g., registering or synchronization step). There is no need to update this information. Therefore, the overhead of communicating the control signal comprising the mapping is minuscule.

The invention claimed is:

1. A method of operating a wireless communication device in a wireless communication system, the method comprising:
   transmitting a control signal to a node of the wireless communication system, the control signal being indicative of a mapping between at least one antenna port and at least two antenna panels of the wireless communication device, wherein the mapping informs the node of which of the at least two antenna panels are coupled to which of one or more shared antenna ports, and the mapping is indicative of a number of antenna ports of the at least one antenna port per antenna panel of the at least two antenna panels, and
   transmitting via each antenna port of the at least one antenna port a corresponding reference signal sequence to the node via a respective at least one antenna panel of the at least two antenna panels that is mapped to the respective antenna port.

2. The method of claim 1, further comprising:
   receiving, from the node, a beam selection control signal which is indicative of at least one transmission beam to be used for further transmissions from the wireless communication device to the node, wherein the beam selection control signal is determined by the node based on the at least one reference signal sequence.

3. The method of claim 2, further comprising:
   deactivating transmission via at least one antenna panel of the at least two antenna panels based on the beam selection control signal.

4. The method of claim 1,
   wherein the node is an access node of a wireless communication network,
   wherein the method further comprises:
      registering the wireless communication device at the access node,
   wherein the control signal is transmitted upon said registering.

5. The method of claim 1,
wherein the mapping is further indicative of a set of identifiers identifying the at least one antenna port mapped to each antenna panel of the at least two antenna panels.

6. A method of operating a node of a wireless communication system, comprising:
receiving a control signal from a wireless communication device, the control signal being indicative of a mapping between at least one antenna port and at least two antenna panels of the wireless communication device, wherein the mapping informs the node of which of the at least two antenna panels are coupled to which of one or more shared antenna ports, and the mapping is indicative of a number of antenna ports of the at least one antenna port per antenna panel of the at least two antenna panels, and
receiving, from the wireless communication device, a plurality of reference signal sequences, each reference signal sequence being transmitted via an antenna port of the at least one antenna port and a respective at least one antenna panel of the at least two antenna panels that is mapped to the respective antenna port.

7. The method of claim 6, further comprising:
determining a beam selection control signal which is indicative of at least one transmission beam to be used for further transmissions from the wireless communication device to the node, wherein the beam selection control signal is determined by the node based on the plurality of reference signal sequences, and
transmitting the beam selection control signal to the wireless communication device.

8. The method of claim 7, comprising:
receiving payload and/or control data from the wireless communication device, the payload and/or control data being transmitted from the wireless communication device using the at least one transmission beam indicated by the beam selection control signal.

9. The method of claim 6,
wherein the mapping is further indicative of a set of identifiers identifying the at least one antenna port mapped to each antenna panel of the at least two antenna panels.

10. A wireless communication device of a wireless communication system, comprising:
at least two antenna panels, and
control circuitry configured to:
transmit a control signal to a node of the wireless communication system, the control signal being indicative of a mapping between at least one antenna port and the at least two antenna panels of the wireless communication device, wherein the mapping informs the node of which of the at least two antenna panels are coupled to which of one or more shared antenna ports, and the mapping is indicative of a number of antenna ports of the at least one antenna port per antenna panel of the at least two antenna panels, and
transmit via each antenna port of the at least one antenna port a corresponding reference signal sequence to the node via a respective at least one antenna panel of the at least two antenna panels that is mapped to the respective antenna port.

11. A node of a wireless communication system, the node comprising control circuitry configured to:
receive a control signal from a wireless communication device, the control signal being indicative of a mapping between at least one antenna port and at least two antenna panels of the wireless communication device, wherein the mapping informs the node of which of the at least two antenna panels are coupled to which of one or more shared antenna ports, and the mapping is indicative of a number of antenna ports of the at least one antenna port per antenna panel of the at least two antenna panels, and
receive, from the wireless communication device, a plurality of reference signal sequences, each reference signal sequence being transmitted via an antenna port of the at least one antenna port and a respective at least one antenna panel of the at least two antenna panels that is mapped to the respective antenna port.

12. The method of claim 1,
wherein the control signal further includes baseband properties of the at least one antenna port.

13. The method of claim 6,
wherein the control signal further includes baseband properties of the at least one antenna port.

14. The method of claim 1, wherein the mapping between the at least one antenna port and the at least two antenna panels is dynamically configurable at the wireless communication device.

15. The method of claim 6, wherein the mapping between the at least one antenna port and the at least two antenna panels is dynamically configurable at the wireless communication device.

16. The wireless communication device of claim 10, wherein the mapping between the at least one antenna port and the at least two antenna panels is dynamically configurable at the wireless communication device.

17. The node of claim 11, wherein the mapping between the at least one antenna port and the at least two antenna panels is dynamically configurable at the wireless communication device.

18. The method of claim 7, wherein determining the beam selection control signal includes the steps of:
selecting a first reference signal sequence of the plurality of reference signal sequences, wherein the first reference signal sequence is transmitted via a first antenna port coupled to a first antenna panel,
determining that a second reference signal sequence of the plurality of reference signal sequences has a first received strength, wherein the second reference signal sequence is transmitted via a second antenna port coupled to a second antenna panel,
determining that a third reference signal sequence of the plurality of reference signal sequences has a second received strength that is less than the first received strength, wherein the third reference signal sequence is transmitted via a third antenna port coupled to the first antenna panel, and
selecting the third reference signal sequence instead of the second reference signal sequence, based on the third reference signal sequence being transmitted via an antenna port coupled to the same antenna panel as the selected first antenna port.

* * * * *